United States Patent
Wei

(10) Patent No.: US 9,891,506 B1
(45) Date of Patent: Feb. 13, 2018

(54) CAMERA STABILIZER

(71) Applicant: GUILIN FEIYU TECHNOLOGY CORPORATION LTD., Guilin, Guangxi (CN)

(72) Inventor: Chengyun Wei, Guangxi (CN)

(73) Assignee: GUILIN FEIYU TECHNOLOGY CORPORATION LTD., Guilin (CN)

( * ) Notice: Subject to any disclaimer, the term of this patent is extended or adjusted under 35 U.S.C. 154(b) by 0 days.

(21) Appl. No.: 15/405,340

(22) Filed: Jan. 13, 2017

(30) Foreign Application Priority Data

Nov. 22, 2016  (CN) .......................... 2016 1 1044935
Nov. 22, 2016  (CN) ..................... 2016 2 1266317 U

(51) Int. Cl.
| | |
|---|---|
| *G03B 17/56* | (2006.01) |
| *F16M 11/04* | (2006.01) |
| *F16M 13/04* | (2006.01) |
| *F16M 11/08* | (2006.01) |
| *F16M 11/12* | (2006.01) |
| *F16M 11/18* | (2006.01) |

(52) U.S. Cl.
CPC ......... *G03B 17/561* (2013.01); *F16M 11/045* (2013.01); *F16M 11/048* (2013.01); *F16M 11/08* (2013.01); *F16M 11/12* (2013.01); *F16M 11/18* (2013.01); *F16M 13/04* (2013.01); *G03B 17/563* (2013.01); *F16M 2200/04* (2013.01)

(58) Field of Classification Search
CPC .................................................. G03B 17/561
USPC ....................................................... 396/421
See application file for complete search history.

(56) References Cited

U.S. PATENT DOCUMENTS

| | | | | |
|---|---|---|---|---|
| 5,737,657 | A * | 4/1998 | Paddock .............. | F16M 11/041 248/187.1 |
| 7,936,984 | B2 * | 5/2011 | Greb ..................... | F16M 13/04 396/421 |
| 9,557,006 | B2 * | 1/2017 | Fee ......................... | F16M 13/04 |
| 2011/0193943 | A1 * | 8/2011 | Campbell ............ | F16M 11/045 348/46 |
| 2016/0201847 | A1 * | 7/2016 | Firchau ................ | F16M 11/041 224/567 |

* cited by examiner

Primary Examiner — Clayton E Laballe
Assistant Examiner — Linda B Smith

(57) ABSTRACT

A camera stabilizer, comprising a mounting assembly and a gravity center adjusting assembly arranged below the mounting assembly, wherein the mounting assembly comprises a mounting mechanism for mounting camera, a longitudinal adjusting mechanism relative to which the mounting mechanism is longitudinally slidable, and a transverse adjusting mechanism relative to which the longitudinal adjusting mechanism is transversely slidable, wherein the gravity center adjusting assembly comprises an adjusting rod mechanism and a counterweight balancing mechanism, wherein the length of the adjusting rod mechanism is adjustable, and the adjusting rod mechanism has an upper end connected to the transverse adjusting mechanism and a lower end fixedly connected to the counterweight balancing mechanism. The present invention aims to provide a camera stabilizer enabling convenient adjustment and balance of the gravity center so as to overcome the problems of inconvenient and time consuming adjustment of gravity center of existing camera stabilizers.

8 Claims, 2 Drawing Sheets

CAMERA STABILIZER

CROSS-REFERENCE TO RELATED APPLICATION

This application claims the benefit of Chinese Patent Application No. 201611044935.5 filed on Nov. 22, 2016 and Chinese Utility Model Application No. 201621266317.0 filed on Nov. 22, 2016, the entire content of which is hereby incorporated by reference.

FIELD OF THE INVENTION

The present invention relates to the field of camera accessories, more particularly to a camera stabilizer.

BACKGROUND OF THE INVENTION

The camera stabilizer is a supporting platform for photography equipment. When the photography equipment is mounted on the camera stabilizer, images can be well captured because the lens of photography equipment can be well adjusted via controlling the camera stabilizer. The application of the stabilizing stand gives camera operator freedom of motion during shooting while reducing visual artifacts in the shot due to that motion, e.g., camera vibration or shake. Overall, some common shooting errors such as crooked, fuzzy pictures can be reduced if such stand is attached.

The handheld camera stabilizer usually comprises a supporting assembly for mounting the photography equipment and a gravity center adjusting assembly, wherein the support assembly is a platform for supporting the photography equipment and adjusting the gravity center position thereof. Most support assemblies available in the market are in fixed size and only photography equipment with specific sizes can be attached, which lead to bad adaptability and portability. Some supporting assemblies offer supports for every camera size, but their horizontal movement may be limited. Some even require the cameras to be installed in different positions on the support assembly based on their weight in order to adjust the center of gravity. Even though the cameras can be adjusted in a horizontal motion, they could possibly move only in one direction. In conclusion, the existing stabilizers have bad adaptability and unsatisfactory gravity center adjustment performance. In addition, the base part of the gravity center adjusting assembly, which serves for balancing the camera stabilizer mounted with photography equipment, mainly consisting of a mounting plate and a counterweight. The existing counterweights at the bottom are usually in fixed positions, yet sometimes fail to balance the stabilizer.

SUMMARY OF THE INVENTION

The present invention aims to overcome the problems of inconvenient and time consuming adjustment of gravity center of existing camera stabilizers.

To achieve the above object, the present invention provides a camera stabilizer, comprising a mounting assembly and a gravity center adjusting assembly arranged below the mounting assembly, wherein the mounting assembly comprises a mounting mechanism for mounting the camera, a longitudinal adjusting mechanism relative to which the mounting mechanism is longitudinally slidable, and a transverse adjusting mechanism relative to which the longitudinal adjusting mechanism is transversely slidable, wherein the gravity center adjusting assembly comprises an adjusting rod mechanism and a counterweight balancing mechanism, wherein the length of the adjusting rod mechanism is adjustable, and the adjusting rod mechanism has an upper end connected to the transverse adjusting mechanism and a lower end connected to the counterweight balancing mechanism.

Preferably, the mounting mechanism comprises a fixing plate provided with a mounting groove for fixing and mounting photography equipment, and a through hole into which a fastening screw is screwed is arranged on the lateral side of the mounting groove.

Preferably, the fixing plate is provided with a slip-proof cushion.

Preferably, the counterweight balancing mechanism comprises a mounting plate and a counterweight, wherein a middle part of the mounting plate is fixedly connected to the lower end of the adjusting rod mechanism, and two ends of the mounting plate are respectively arranged with a counterweight mounting groove, on which a counterweight slidable along the counterweight mounting groove is provided.

Preferably, the camera stabilizer further comprises a hand-held component arranged on the adjusting rod mechanism.

Preferably, the camera stabilizer further comprises a rotating component arranged at the joint of the adjusting rod mechanism and the hand-held component.

Preferably, the rotating component comprises:

a first adjusting mechanism for adjusting the pitching angle of the mounting assembly;

a second adjusting mechanism for adjusting the rolling angle of the mounting assembly; and a third adjusting mechanism for adjusting the yawing angle of the mounting assembly.

Preferably, the first adjusting mechanism comprises a pitching motor, the second adjusting mechanism comprises a rolling motor, the third adjusting mechanism comprises a yawing motor, a rotor of the yawing motor is connected with the mounting assembly through the first connecting arm, a lower end of a stator of the yawing motor is connected with the upper end of the adjusting rod mechanism, a lateral part of the stator of the yawing motor is connected with a rotor of the pitching motor through the second connecting arm, a stator of the pitching motor is connected with a rotor of the rolling motor through the third connecting arm, and a stator of the rolling motor is connected with the hand-held component.

Preferably, the third connecting arm is a U-shaped connecting arm with two ends on the opening side respectively connected to the stator of the pitching motor and to another lateral part of the stator of the yawing motor and a middle part connected to the rotor of the rolling motor.

Preferably, the hand-held component comprises a first connecting rod, a second connecting rod, a first handle, a second handle, and a third handle, wherein the first connecting rod and the second connecting rod are symmetrically connected to both sides of the stator of the rolling motor, respectively, the first handle is connected to the first connecting rod, the second handle is connected to the stator of the rolling motor and is arranged between the first connecting rod and the second connecting rod, the third handle is connected to the second connecting rod, and at least one of the first handle, the second handle and the third handle is provided with a button for controlling the camera stabilizer.

The present invention provides a camera stabilizer comprising a mounting assembly and a gravity center adjusting assembly arranged below the mounting assembly, allowing convenient and easy adjustment of gravity center of the photography equipment by means of the longitudinal adjusting mechanism and the transverse adjusting mechanism, enabling quick balance of the gravity center of the whole camera stabilizer by the counterweight balancing mechanism in combination with the adjusting rod mechanism, and improving the users' experience of operating the camera stabilizer and improving efficiency as well.

In the figures: 100. camera stabilizer;
1. mounting assembly; 11. mounting mechanism; 111. fixing plate; 112. mounting groove; 113. through hole; 114. fastening screw; 115. slip-proof cushion; 116. first guide rail; 12. longitudinal adjusting mechanism; 121. longitudinal adjusting plate; 122. first locking screw; 123. second locking screw; 124. first recess; 125. second guide rail; 13. transverse adjusting mechanism; 131. transverse adjusting plate; 132. second recess;
2. gravity center adjusting assembly; 21. adjusting rod mechanism; 211. first rod body; 212. second rod body; 213. locking ring; 22. counterweight balancing mechanism; 221. mounting plate; 222. counterweight; 223. counterweight mounting groove;
3. rotating component; 31. first adjusting mechanism; 32. second adjusting mechanism; 33. third adjusting mechanism; 34. first connecting arm; 35. second connecting arm; 36. third/U-shaped connecting arm; 331. rotor of yawing motor; 332. stator of yawing motor; 321. rotor of pitching motor; 322. stator of pitching motor; 311. rotor of rolling motor; 312. stator of rolling motor.
4. hand-held component; 41. first connecting rod; 42. second connecting rod; 43. first handle; 44. second handle; 45. third handle; 46. button.

DETAILED DESCRIPTION OF ILLUSTRATED EMBODIMENTS

The present invention will be further explained below in detail with reference to figures and particular embodiments. The embodiments described are to be regarded as illustrative rather than restrictive.

Figure 1:
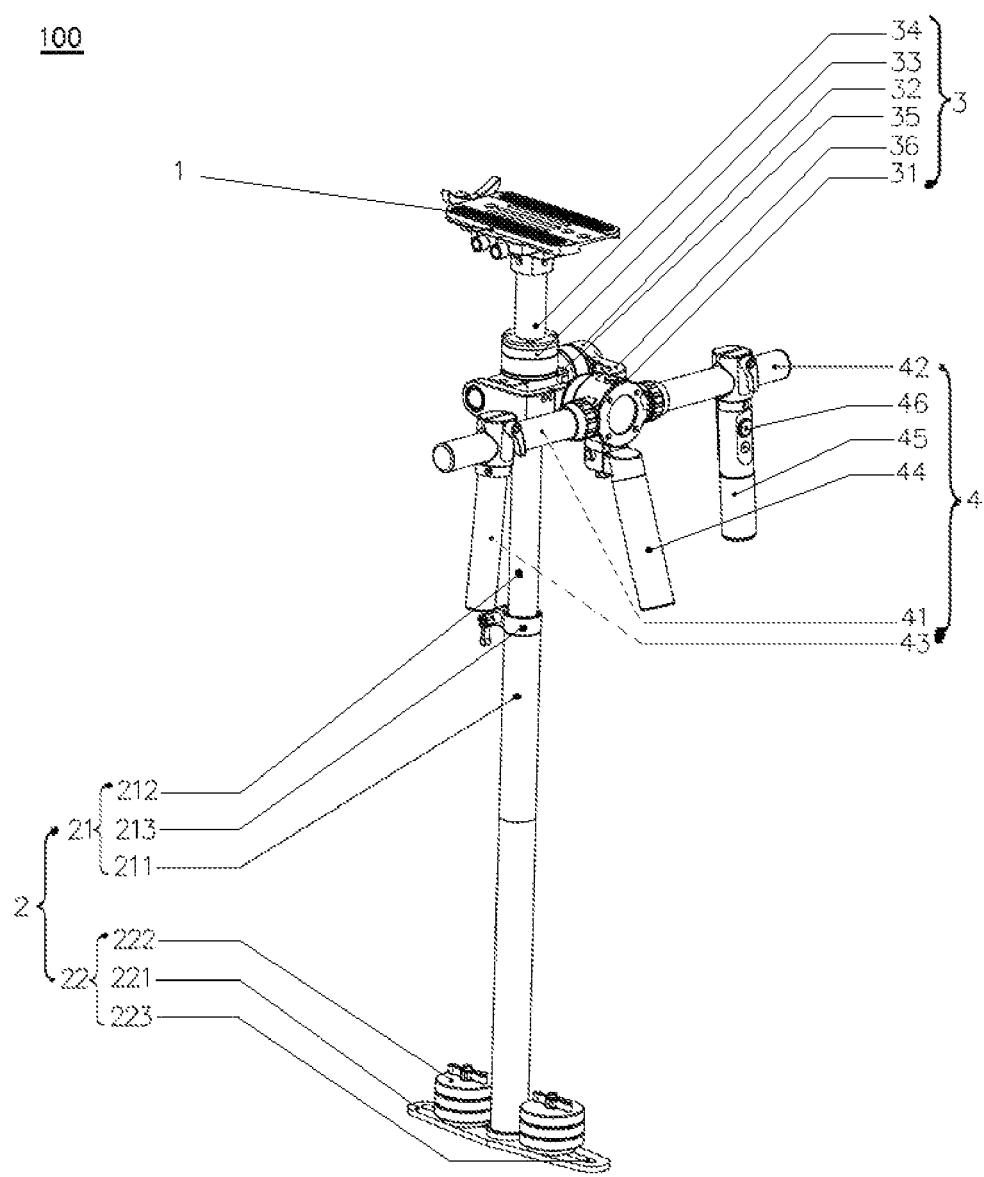
FIG. 1 is a schematic drawing of a camera stabilizer according to an embodiment of the present invention.

Please referring to FIG. 1, a camera stabilizer 100 according to a preferred embodiment of the present invention comprises a mounting assembly 1 and a gravity center adjusting assembly 2, wherein the mounting assembly 1 is arranged above the gravity center adjusting assembly 2.

Herein, the mounting assembly 1 comprises a mounting mechanism 11 for mounting and fixing the camera, a longitudinal adjusting mechanism 12 relative to which the mounting mechanism 11 is longitudinally slidable, and a transverse adjusting mechanism 13 relative to which the longitudinal adjusting mechanism 12 is transversely slidable; and the gravity center adjusting assembly 2 comprises an adjusting rod mechanism 21 and a counterweight balancing mechanism 22, wherein the length of the adjusting rod mechanism 21 is adjustable, and the adjusting rod mechanism 21 has an upper end connected to the transverse adjusting mechanism 13 and a lower end connected to the counterweight balancing mechanism 22.

In the embodiment, due to the longitudinal adjusting mechanism 12 and the transverse adjusting mechanism 13, the gravity center of the mounting mechanism 11 mounted with photography equipment can be easily adjusted along two directions in the plane. In addition, due to the counterweight balancing mechanism in combination with the adjusting rod mechanism, the center of gravity of the whole camera stabilizer can be balanced quickly.

In an exemplary embodiment, the adjusting rod mechanism may comprise a first rod body 211, a second rod body 212, and a locking ring 213, wherein the first rod body 211 is sleeved with at least one second rod body 212, the second rod body can be moved telescopically relative to the first rod body and can be locked at a predetermined position by the locking ring 213. In a preferred embodiment, the first rod body 211 and the second rod body 212 are both hollow inside, and one second rod body 212 is sleeved on the first rod body 211.

Furthermore, the adjusting rod mechanism 21 may have a retractable telescopic structure, or an electrically controlled and locked structure.

Figure 2:
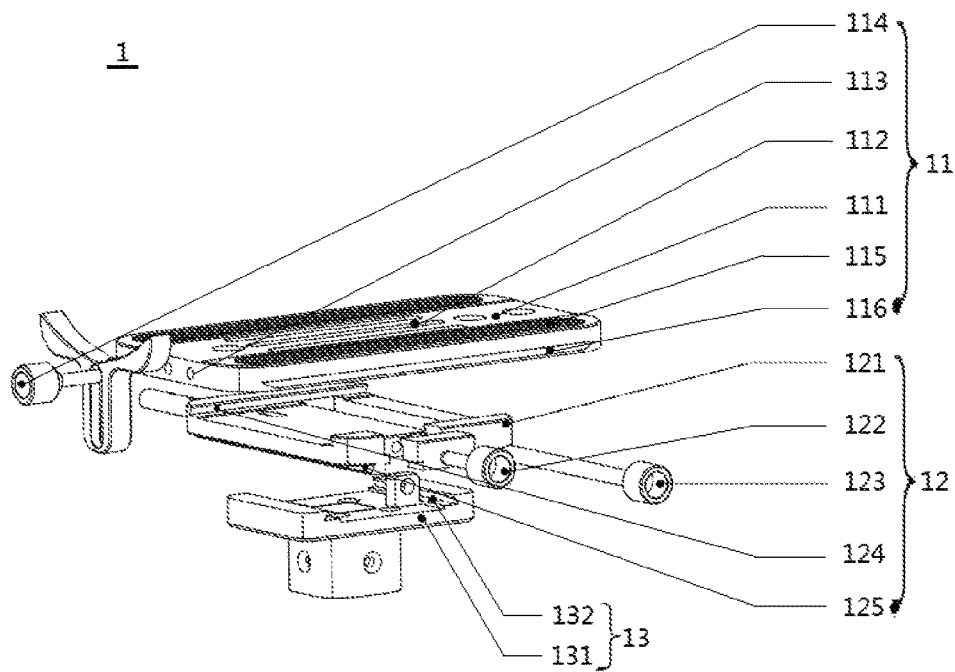
FIG. 2 is an exploded view of a mounting assembly according to an embodiment of the present invention.

Please referring to FIG. 2, the mounting mechanism 11 according to a preferred embodiment of the present invention may comprise a fixing plate 111, mounting grooves 112, through holes 113, a fastening screw 114, and slip-proof cushions 115. The mounting grooves 112 for mounting the camera are arranged at the center of the fixing plate 111. The through holes 113 are arranged on one lateral side of the fixing plate 111, and the photography equipment mounted on the mounting grooves 112 may be fixed by the fastening screw 114 through the through holes 113. In order to better position the photography equipment, the slip-proof cushions 115 may be arranged on an upper surface of the fixing plate 111. Moreover, the mounting mechanism may be a clamping type mounting device.

In a further preferred embodiment, a plurality of mounting grooves 112 adapted to several types and sizes of photography equipment may be arranged on the fixing plate 111, thereby improving adaptability of the mounting mechanism 11 and broadening the scope of application of the whole device.

In an exemplary embodiment, the mounting assembly 1 may comprise a mounting mechanism 11, a longitudinal adjusting mechanism 12 and a transverse adjusting mechanism 13, the longitudinal adjusting mechanism 12 may comprise a longitudinal adjusting plate 121, a first locking screw 122 and a second locking screw 123, and the transverse adjusting mechanism 13 may comprise a transverse adjusting plate 131. The fixing plate 111 is arranged with first guide rails 116 at two sides on the underside, respectively. A first recess 124 which matches with the first guide rail 116 of the fixing plate 111 is arranged above the longitudinal adjusting plate 121. The fixing plate 111 can slide along the first recess 124 so as to adjust the longitudinal center of gravity of the photography equipment, and after finishing adjusting, it can be locked by the first locking screw 122 provided on a lateral side of the longitudinal adjusting plate 121. The longitudinal adjusting plate 121 is arranged with second guide rails 125 at two sides on the underside, respectively. A second recess 132 which matches with the second guide rail 125 of the longitudinal adjusting plate 121 is arranged above the transverse adjusting plate 131. By screwing the second locking screw 123 of the longitudinal adjusting plate 121, the longitudinal adjusting plate 121 can be moved to slide along the second recess 132 so as to adjust the transverse center of gravity of the photography equipment. The longitudinal adjusting mechanism 12 and the transverse adjusting mechanism 13 may also employ adjusting means such as gear, screw rod, etc.

The counterweight balancing mechanism 22 comprises a mounting plate 221 and counterweights 222, wherein a middle part of the mounting plate 221 is fixedly connected with the lower end of the adjusting rod mechanism 21, and two ends of the mounting plate 221 are respectively arranged with a counterweight mounting groove 223, and counterweights 222 are provided on the counterweight mounting groove 223 and are slidable along the counterweight mounting groove 223.

Preferably, the counterweight mounting groove 223 may be a straight line groove, or a wavy line groove. Due to the counterweight mounting groove 223, the counterweights 222 can slide along the counterweight mounting groove 223 to move in position, so that the gravity center of the counterweights 222 can be conveniently and easily adjusted. Furthermore, the gravity center of the counterweights 222 arranged on two sides of the mounting plate 221 can be adjusted by increasing or decreasing the counterweights as needed. The lower end of the adjusting rod mechanism 21 may be connected with the middle part of the mounting plate 221 in a detachable manner. It may slide along the adjusting rod mechanism 21 to further adjust the centre-of-gravity position of the whole gravity center adjusting assembly 2.

In order to facilitate holding, a hand-held component 4 may be provided on the adjusting rod mechanism 21.

In order to adjust and stabilize the camera angle, a rotating component 3 may be arranged at the joint of the adjusting rod mechanism 21 and the hand-held component 4.

Figure 3:
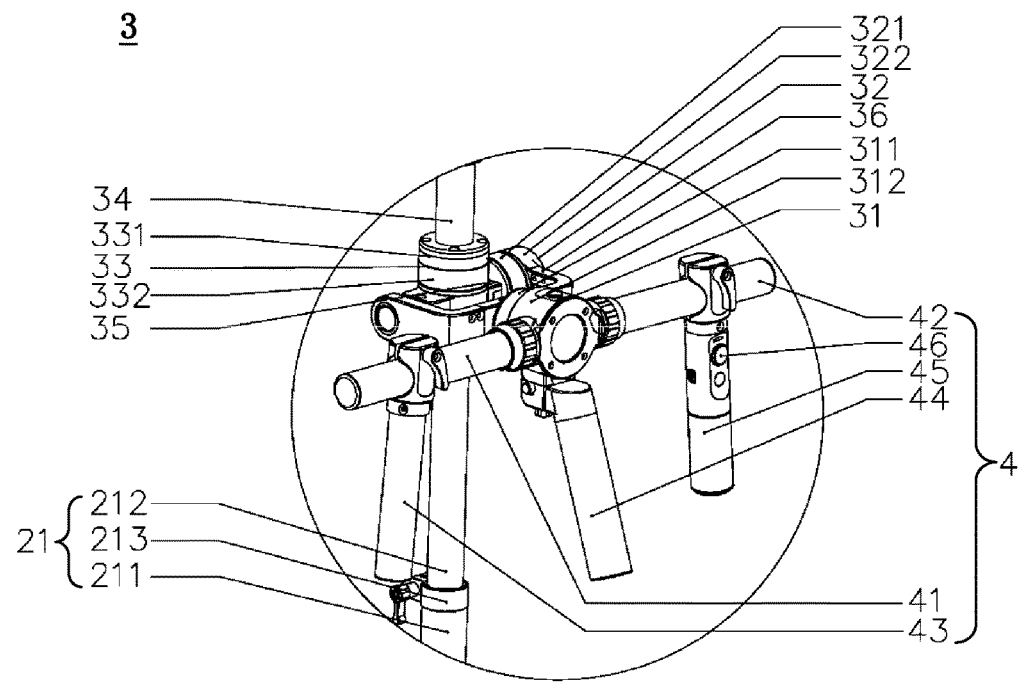
FIG. 3 is an enlarged view of a rotating component shown in FIG. 1.

Preferably, referring to FIGS. 1 and 3, the rotating component 3 comprises a first adjusting mechanism 31 for adjusting a rolling angle of the mounting assembly 1, a second adjusting mechanism 32 for adjusting a pitching angle of the mounting assembly 1, and a third adjusting mechanism 33 for adjusting a yawing angle of the mounting assembly 1. Furthermore, the rotating component may also be a universal joint assembly.

More preferably, in order to easily adjust and stabilize the camera angle and increase the level of automation, the first adjusting mechanism 31 may comprise a rolling motor, the second adjusting mechanism 32 may comprise a pitching motor, and the third adjusting mechanism 33 may comprise a yawing motor.

Herein, a rotor 331 of the yawing motor is connected with the mounting assembly 1 through the first connecting arm 34, a lower end of a stator 332 of the yawing motor is connected with the upper end of the adjusting rod mechanism 21, a lateral part of the stator 332 of the yawing motor is connected with a rotor 321 of the pitching motor through the second connecting arm 35, a stator 322 of the pitching motor is connected with a rotor 311 of the rolling motor through the third connecting arm 36, and a stator 312 of the rolling motor is connected with the hand-held component 4. In this way, the pitching angle, the rolling angle and the yawing angle of the camera can be adjusted.

Preferably, the third connecting arm 36 may be a U-shaped connecting arm 36 with two ends on the opening side respectively connected to the stator 322 of the pitching motor and to another lateral part of the stator 332 of the yawing motor and with a middle part connected to the rotor 311 of the rolling motor. Due to the U-shaped connecting arm 36, the first adjusting mechanism 31 and the second adjusting mechanism 32 can be uniformly forced, thereby improving structure stability and increasing durability of parts.

In order to further facilitate holding, in an exemplary embodiment, the hand-held component 4 may comprise a first connecting rod 41, a second connecting rod 42, a first handle 43, a second handle 44, a third handle 45, and a button 46, wherein the first connecting rod 41 and the second connecting rod 42 are symmetrically connected to both sides of the stator of the rolling motor, respectively, the first handle 43 is connected to the first connecting rod 41, the second handle 44 is connected to the stator of the rolling motor and is arranged between the first connecting rod 41 and the second connecting rod 42, the third handle 43 is connected to the second connecting rod 42, and at least one of the first handle 43, the second handle 44 and the third handle 45 is provided with buttons 46 for controlling the camera stabilizer.

Preferably, the first connecting rod 41, the second connecting rod 42, the first handle 43, the second handle 44, and the third handle 45 are all detachable.

Preferably, the buttons 46 may be all arranged on the third handle 45, so as to improve operating efficiency.

The hand-held component may merely comprise the second handle 44 and the button 46.

Overall, the present invention provides a camera stabilizer comprising a mounting assembly and a gravity center adjusting assembly, allowing easy adjustment of the gravity center of the mounting assembly mounted with the photography equipment along two directions in the plane by means of the longitudinal adjusting mechanism and the transverse adjusting mechanism, enabling convenient and quick balance of the gravity center of the counterweight by the counterweight balancing mechanism, improving the operation and performance of adjusting the gravity center, and increasing gravity center adjusting efficiency as well.

All the above are merely the preferred embodiments of the present invention. It should be noted that, those skilled in the art may change or modify those without departing from the scope of the present invention, the present invention is intended to cover all changes, various modifications and equivalent arrangements included within the principle and scope of the present invention according to the technical essence of the present invention.

What is claimed is:

1. A camera stabilizer, characterized in that: it comprises a mounting assembly and a gravity center adjusting assembly arranged below the mounting assembly;
    wherein the mounting assembly comprises a mounting mechanism for mounting camera, a longitudinal adjusting mechanism relative to which the mounting mechanism is longitudinally slidable, and a transverse adjusting mechanism relative to which the longitudinal adjusting mechanism is transversely slidable;
    wherein the gravity center adjusting assembly comprises an adjusting rod mechanism and a counterweight balancing mechanism, the length of the adjusting rod mechanism is adjustable, and the adjusting rod mechanism has an upper end connected to the transverse adjusting mechanism and a lower end connected to the counterweight balancing mechanism;
    the camera stabilizer further comprises a hand-held component provided on the adjusting rod mechanism;
    the camera stabilizer further comprises a rotating component arranged at the joint of the adjusting rod mechanism and the hand-held component;
    the rotating component comprises: a first adjusting mechanism for adjusting a rolling angle of the mounting assembly; a second adjusting mechanism for adjusting a pitching angle of the mounting assembly; and a third adjusting mechanism for adjusting a yawing angle of the mounting assembly;

the first adjusting mechanism comprises a rolling motor, the second adjusting mechanism comprises a pitching motor, the third adjusting mechanism comprises a yawing motor;

a rotor of the yawing motor is connected with the mounting assembly through a first connecting arm, a lower end of a stator of the yawing motor is connected with the upper end of the adjusting rod mechanism, a lateral part of the stator of the yawing motor is connected with a rotor of the pitching motor through a second connecting arm, a stator of the pitching motor is connected with a rotor of the rolling motor through a third connecting arm, and a stator of the rolling motor is connected with the hand-held component.

2. The camera stabilizer according to claim 1, characterized in that: the mounting mechanism comprises a fixing plate, the fixing plate is provided with a mounting groove for fixing and mounting photography equipment, and a through hole into which a fastening screw is screwed is arranged on a lateral side of the mounting groove.

3. The camera stabilizer according to anyone of claim 1, characterized in that: the counterweight balancing mechanism comprises a mounting plate and a counterweight, wherein a middle part of the mounting plate is fixedly connected with the lower end of the adjusting rod mechanism, and two ends of the mounting plate are respectively arranged with a counterweight mounting groove, and a counterweight is provided on the counterweight mounting groove and is slidable along the counterweight mounting groove.

4. The camera stabilizer according to claim 1, characterized in that: two ends of the opening side of the third connecting arm are respectively connected to the stator of the pitching motor and to another lateral part of the stator of the yawing motor, and a middle part of the third connecting arm is connected to the rotor of the rolling motor.

5. The camera stabilizer according to claim 1, characterized in that: the hand-held component comprises a first connecting rod, a second connecting rod, a first handle, a second handle, and a third handle; wherein the first connecting rod and the second connecting rod are symmetrically connected to two sides of the stator of the rolling motor, respectively, the first handle is connected to the first connecting rod, the second handle is connected to the stator of the rolling motor and is positioned between the first connecting rod and the second connecting rod, the third handle is connected to the second connecting rod, and at least one of the first handle, the second handle and the third handle is provided with a button for controlling the camera stabilizer.

6. The camera stabilizer according to claim 2, characterized in that: a slip-proof cushion is arranged on the fixing plate.

7. The camera stabilizer according to anyone of claim 2, characterized in that: the counterweight balancing mechanism comprises a mounting plate and a counterweight, wherein a middle part of the mounting plate is fixedly connected with the lower end of the adjusting rod mechanism, and two ends of the mounting plate are respectively arranged with a counterweight mounting groove, and a counterweight is provided on the counterweight mounting groove and is slidable along the counterweight mounting groove.

8. The camera stabilizer according to anyone of claim 6, characterized in that: the counterweight balancing mechanism comprises a mounting plate and a counterweight, wherein a middle part of the mounting plate is fixedly connected with the lower end of the adjusting rod mechanism, and two ends of the mounting plate are respectively arranged with a counterweight mounting groove, and a counterweight is provided on the counterweight mounting groove and is slidable along the counterweight mounting groove.

* * * * *